United States Patent
Al-Nakhli et al.

(10) Patent No.: US 9,995,120 B2
(45) Date of Patent: Jun. 12, 2018

(54) FLOWING FRACTURING FLUIDS TO SUBTERRANEAN ZONES

(71) Applicant: Saudi Arabian Oil Company, Dhahran (SA)

(72) Inventors: Ayman Raja Al-Nakhli, Dammam (SA); Abeer Mohammad Saleh Al-Olayan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days. days.

(21) Appl. No.: 14/540,611

(22) Filed: Nov. 13, 2014

(65) Prior Publication Data

US 2016/0138376 A1    May 19, 2016

(51) Int. Cl.
| | |
|---|---|
| *E21B 43/25* | (2006.01) |
| *C09K 8/512* | (2006.01) |
| *C09K 8/76* | (2006.01) |
| *E21B 43/16* | (2006.01) |
| *C09K 8/68* | (2006.01) |

(Continued)

(52) U.S. Cl.
CPC ............ *E21B 43/16* (2013.01); *C09K 8/512* (2013.01); *C09K 8/685* (2013.01); *C09K 8/72* (2013.01); *C09K 8/76* (2013.01); *C09K 8/88* (2013.01); *C09K 8/887* (2013.01); *E21B 43/26* (2013.01)

(58) Field of Classification Search
CPC .......... E21B 43/25; E21B 43/16; E21B 43/28; E21B 43/261; E21B 43/162; E21B 43/20; E21B 21/08; E21B 43/283; C09K 8/76; C09K 8/58; C09K 8/62

See application file for complete search history.

(56) References Cited

U.S. PATENT DOCUMENTS

| | | |
|---|---|---|
| 3,480,084 A | 11/1969 | Eilers |
| 3,794,115 A | 2/1974 | Skagerberg |

(Continued)

FOREIGN PATENT DOCUMENTS

| | | |
|---|---|---|
| EP | 1739123 | 1/2007 |
| WO | WO2004005672 | 1/2004 |

(Continued)

OTHER PUBLICATIONS

Nimerick, K. H., Temple, H. L., & Card, R. J. (Jun. 1, 1997). New pH-Buffered Low-Polymer Borate-Crosslinked Fluids. Society of Petroleum Engineers. doi:10.2118/35638-PA.*

(Continued)

*Primary Examiner* — William D Hutton, Jr.
*Assistant Examiner* — Charles R Nold
(74) *Attorney, Agent, or Firm* — Fish & Richardson P.C.

(57) ABSTRACT

Implementations provide flowing of fracturing fluids to subterranean zones. Actions can include In some examples, a method includes actions of flowing a mixture of a first quantity of acid and a second quantity of a polymer diverting agent (PDA) having a viscosity that changes with acid concentration to a first portion of a subterranean zone, wherein the first quantity decreases as the acid reacts with metal in the first portion, and wherein the viscosity of the PDA increases as the first quantity decreases to form a PDA gel and flowing a third quantity of acid through the subterranean zone, wherein the PDA gel diverts the acid from the first portion to a second portion of the subterranean zone.

17 Claims, 10 Drawing Sheets

(51) Int. Cl.
  *C09K 8/72* (2006.01)
  *C09K 8/88* (2006.01)
  *E21B 43/26* (2006.01)

(56) References Cited

U.S. PATENT DOCUMENTS

| | | | |
|---|---|---|---|
| 4,619,776 | A | 10/1986 | Mondshine |
| 5,203,413 | A | 4/1993 | Zerhboub |
| 7,303,018 | B2 | 12/2007 | Cawiezel et al. |
| 7,325,613 | B2 | 2/2008 | Reddy et al. |
| 7,774,183 | B2 | 8/2010 | Tardy et al. |
| 2003/0139298 | A1 | 7/2003 | Fu et al. |
| 2004/0262002 | A1 | 12/2004 | Huang et al. |
| 2008/0103068 | A1* | 5/2008 | Parris .............. C09K 8/685 507/261 |
| 2010/0314112 | A1 | 12/2010 | Spangle |
| 2011/0303415 | A1 | 12/2011 | Todd et al. |
| 2012/0004148 | A1 | 1/2012 | Ogle et al. |
| 2012/0097392 | A1 | 4/2012 | Reyes et al. |
| 2012/0270760 | A1 | 10/2012 | Sun et al. |
| 2012/0275268 | A1 | 11/2012 | Tang et al. |
| 2012/0310011 | A1 | 12/2012 | Sun et al. |
| 2013/0133887 | A1* | 5/2013 | Todd .............. C09K 8/035 166/281 |
| 2014/0116707 | A1 | 5/2014 | Sarda et al. |
| 2014/0262296 | A1* | 9/2014 | Dobson, Jr. .......... C09K 8/685 166/308.5 |
| 2014/0352961 | A1* | 12/2014 | Dobson, Jr. .......... C09K 8/685 166/280.1 |

FOREIGN PATENT DOCUMENTS

| | | |
|---|---|---|
| WO | WO2005001242 | 1/2005 |
| WO | WO2013115981 | 8/2013 |
| WO | WO2013188413 | 12/2013 |

OTHER PUBLICATIONS

Kakadjian, S., Rauseo, O., Marquez, R., Gabay, R., Tirado, Y., & Blanco, J. (Jan. 1, 2011). Crosslinked Emulsion to Be Used as Fracturing Fluids. Society of Petroleum Engineers. doi:10.2118/65038-MS.*

Poyyara et al. "Optimization of Acid Treatments by accessing Diversion Strategies in Carbonate and Sandstone Formations", International Science Index, vol. 8, No. 9, 2014.*

"A Crossed-Lined Polymer" Exhibition Chemistry, Royal Society of Chemistry, Jan. 2005, 3 pages. http://www.rsc.org/Education/EiC/issues/2005_Jan/exhibition.asp.

"Experiment 2—Slime Away", Department of Materials Science and Engineering University of Illinois Urbana-Champaign, on or before Nov. 17, 2010, 4 pages. http://matse1.matse.illinois.edu/polymers/e.html.

"Slime", The Department of Chemisty & Biochemistry, FSU, Last Modified Mar. 16, 2010, 2 pages. http://www.chem.fsu.edu/outreach/slime.php.

Al-Nakhli et al., "Interactions of Iron and Viscoelastic Surfactants During Well Stimulation: A New Formation Damage Mechanism", SPE 117060, Copyright 2008, 14 pages.

International Search Report and Written Opinion of the International Searching Authority issued in International Application No. PCT/US2015/059156 dated Feb. 5, 2016; 10 pages.

* cited by examiner

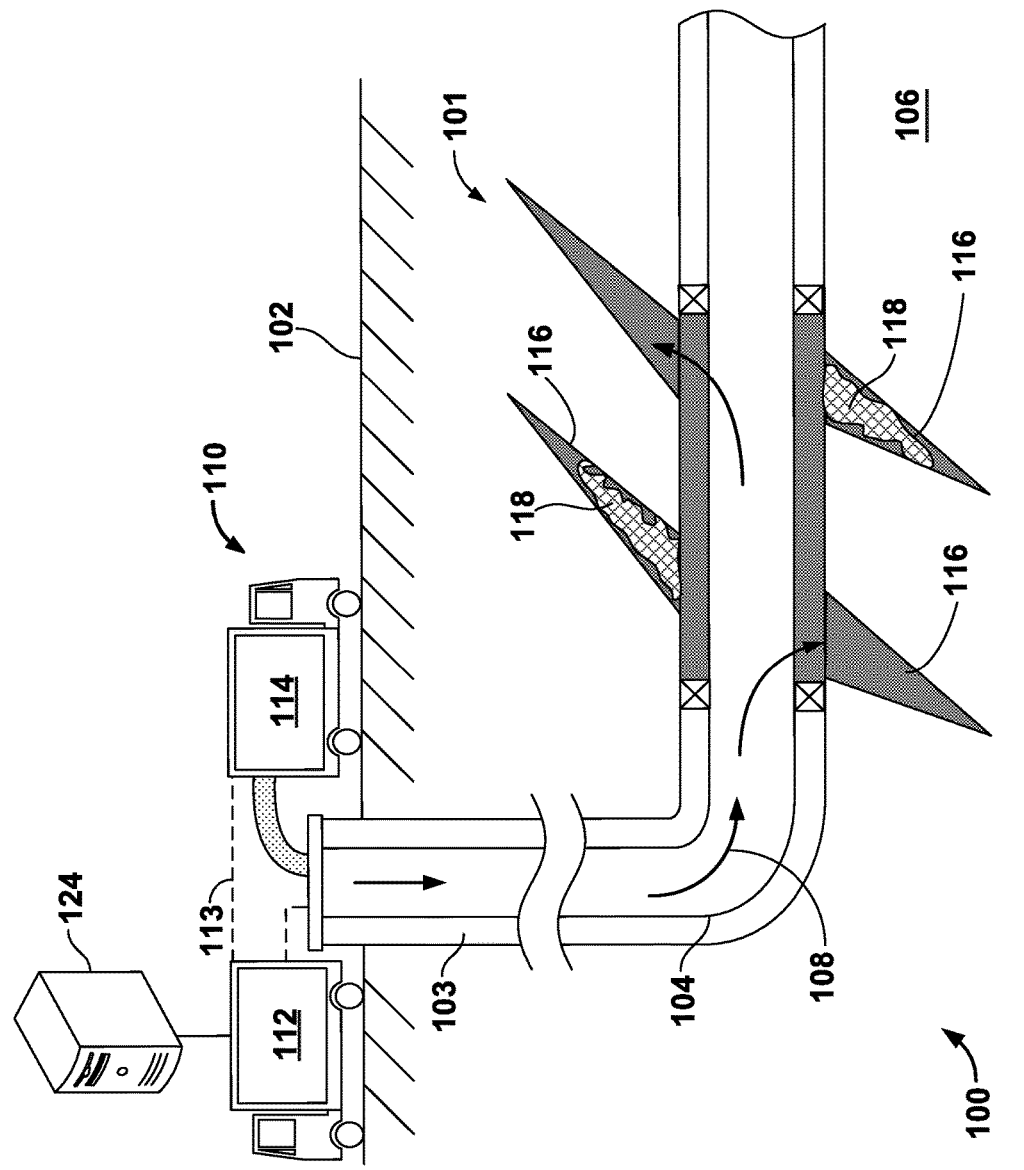

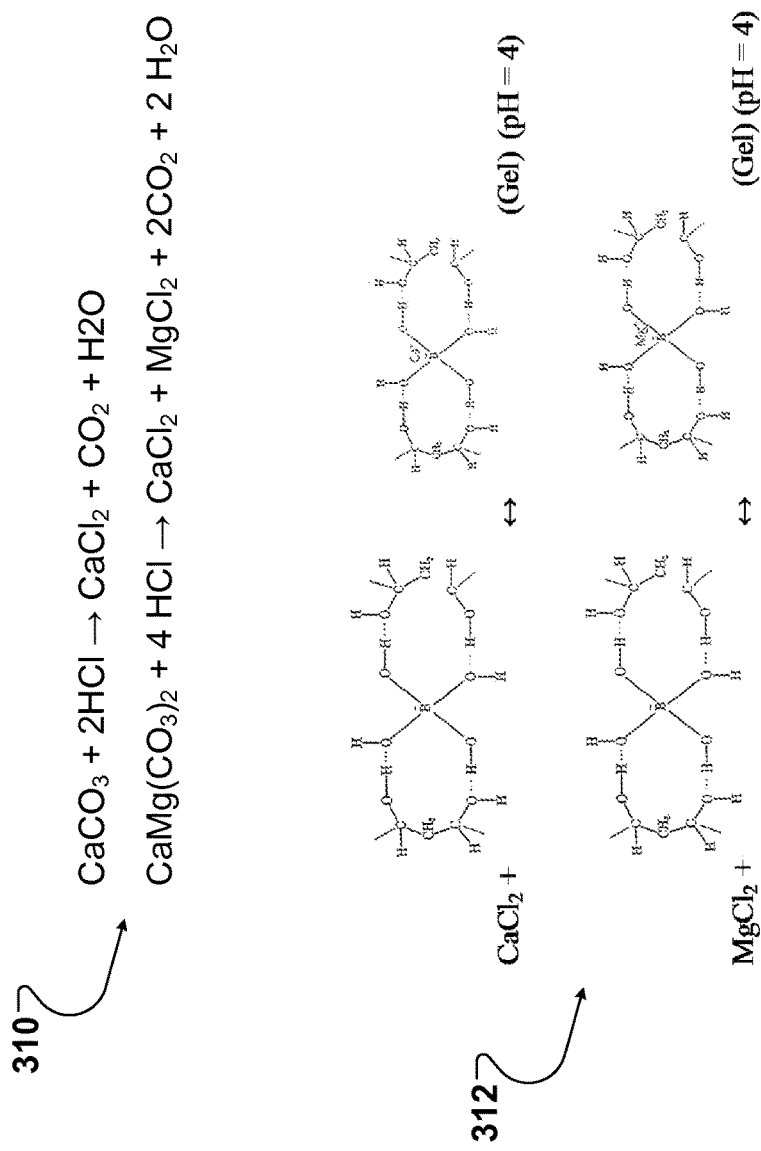

FLOWING FRACTURING FLUIDS TO SUBTERRANEAN ZONES

TECHNICAL FIELD

This disclosure relates to fracturing subterranean zones from which hydrocarbons can be recovered.

BACKGROUND

Fracturing fluid is often injected into subterranean reservoirs to hydraulically fracture the reservoir rock. In some instances, the hydraulic fracturing treatment includes an acid stage. During the acid stage, a solution of several thousand gallons of water mixed with a dilute acid (e.g., hydrochloric, muriatic acid, or other acid) is used to clear cement debris in the wellbore and provide an open conduit for hydrocarbons by dissolving carbonate minerals and opening fractures near the wellbore. Diverting agents can be used to divert acid from high permeable zones to damaged or low permeable zones to ensure homogeneous fracturing treatment.

SUMMARY

This disclosure describes methods of flowing fracturing fluids to subterranean zones. In some examples, a method includes actions of flowing a mixture of a first quantity of acid and a second quantity of a polymer diverting agent (PDA) having a viscosity that changes with acid concentration to a first portion of a subterranean zone, wherein the first quantity decreases as the acid reacts with metal in the first portion, and wherein the viscosity of the PDA increases as the first quantity decreases to form a PDA gel and flowing a third quantity of acid through the subterranean zone, wherein the PDA gel diverts the acid from the first portion to a second portion of the subterranean zone. In some implementations, the method further includes the operation of forming the PDA by performing a cross-linked polymerization reaction between poly-vinyl alcohol (PVA) and sodium tetraborate decahydrate (Borax).

In some implementations, performing the cross-linked polymerization reaction includes: preparing a first solution of a fourth quantity of PVA in water, preparing a second solution of a fifth quantity of Borax in water and mixing a first volume of the first solution and a second volume of the second solution. The fourth quantity and the fifth quantity is substantially 40 g of PVA per liter and substantially 40 g of Borax per liter, respectively.

In some implementations, the method further includes the operation of heating the water in the first solution to a first temperature before adding the fourth quantity of the PVA and heating the water to a second temperature that is greater than the first temperature after adding the fourth quantity of the PVA. The first temperature is substantially 50° C. and the second temperature is substantially 90° C. A ratio of the second quantity and the first quantity is substantially 15%-20% by weight. In some implementations, the method further includes the operation of verifying a homogeneity of flow between the first portion and the second portion of the subterranean zone. In some implementations, the method further includes the operation of the PDA gel from the first portion by flowing water or oil to the first portion. The acid includes hydrochloric acid.

The present disclosure also provides another method that includes actions of fracturing a first portion of a subterranean zone by flowing a mixture including a first quantity of acid and a second quantity of a polymer diverting agent having a viscosity that changes with acid concentration, wherein the acid fractures the first portion, wherein the first quantity decreases as the acid reacts with metal in the first portion, and wherein the viscosity of the PDA increases as the first quantity decreases to form a PDA gel and fracturing a second portion of the subterranean zone by flowing acid to the first portion, wherein the PDA gel diverts the acid from the first portion to the second portion.

In some implementations, the method further includes the operation of forming the PDA by performing a cross-linked polymerization reaction between poly-vinyl alcohol (PVA) and sodium tetraborate decahydrate (Borax). Performing the cross-linked polymerization reaction can include preparing a first solution of a fourth quantity of PVA in water, preparing a second solution of a fifth quantity of Borax in water and mixing a first volume of the first solution and a second volume of the second solution. The fourth quantity is substantially 40 g of PVA per liter and the fifth quantity is substantially 40 g of Borax per liter.

In some implementations, the method further includes the operation of heating the water in the first solution to a first temperature of substantially 50° C. before adding the fourth quantity of the PVA and heating the water to a second temperature of substantially 90° C. that is greater than the first temperature after adding the fourth quantity of the PVA. The ratio of the second quantity and the first quantity is substantially 15%-20% by weight. In some implementations, the method further includes the operation of removing the PDA gel from the first portion by flowing water or oil to the first portion. The acid includes hydrochloric acid.

The present disclosure further provides another method that includes actions of temporarily blocking flow through a first portion of a subterranean zone using a polymer diverting agent (PDA) gel that forms at the first portion in response to an increase in viscosity of a PDA in a mixture of acid and the PDA, wherein the viscosity of the PDA increases in response to a decrease in concentration of the acid in the mixture, and wherein the concentration of the acid in the mixture decreases in response to the acid reacting with metal in the first portion and diverting additional acid flowed to the first portion to a second portion of the subterranean zone, wherein the PDA gel diverts the acid from the first portion to the second portion. The first portion is a permeable portion of the subterranean zone and the second portion is a damaged portion of the subterranean zone.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A illustrates an example well system including examples of damaged fractured zones.

FIGS. 3B and 3C are example chemical formulas for varying the viscosity of a polymer diverting agent as function of pH

Like reference numbers and designations in the various drawings indicate like elements.

DETAILED DESCRIPTION

Figure 1B:
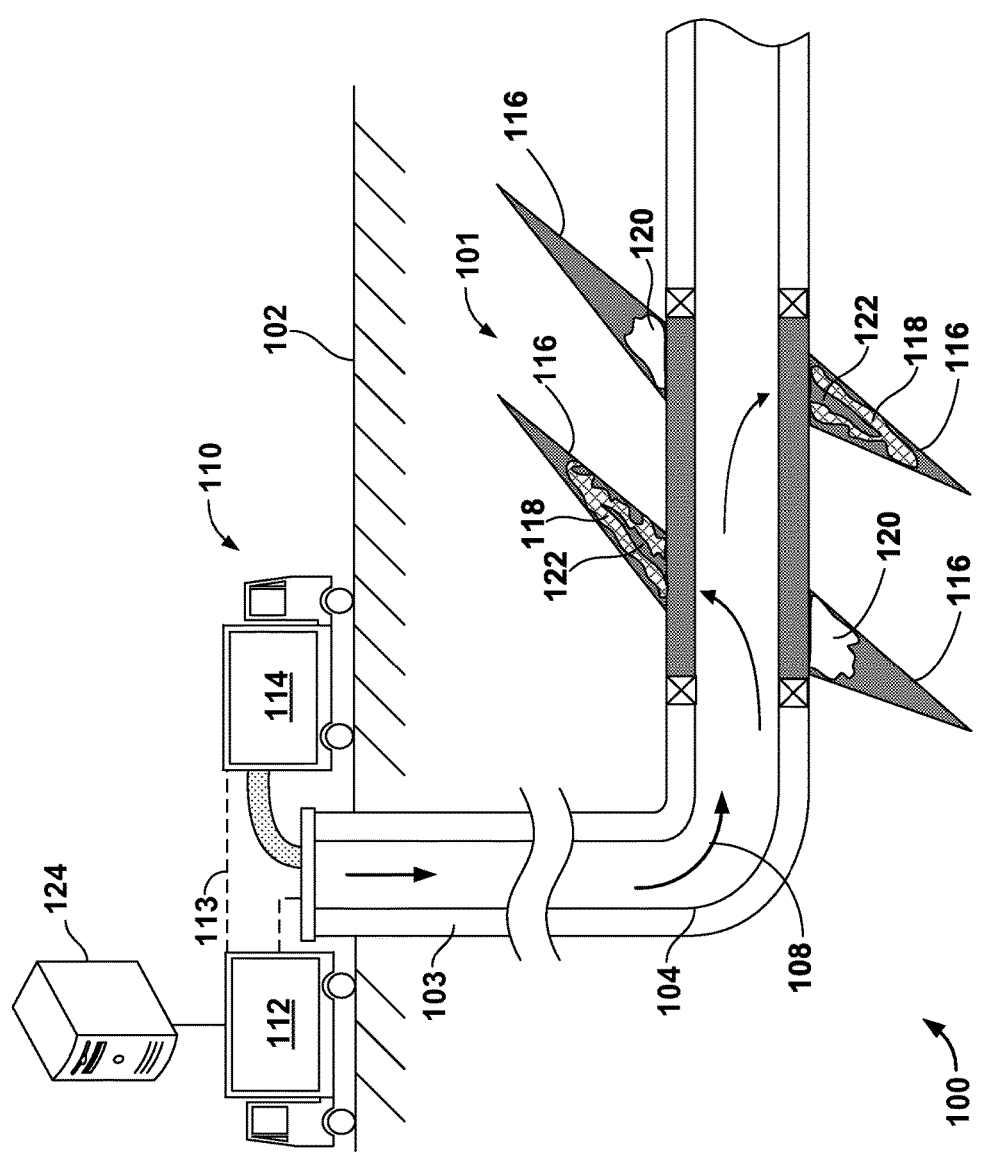
FIG. 1B illustrates an example well system including an example embodiment of acid diversion through a wellbore.

This disclosure describes a polymer composition that can be used as self-diverting acid system for carbonate acidizing treatments. The polymer diverting agent (PDA) can be synthesized using a cross-linked polymerization reaction between poly-vinyl alcohol (PVA) with sodium tetraborate decahydrate $Na_2B_4O_7.10H_2O$ (Borax). The resultant PDA is a fluid with reversible increased viscosity. For example, PDA has low viscosity in media with low pH and it gels when the pH level increases (e.g., acid concentration is reduced). Diverter stages can be repeatedly pumped in conjunction with acid stages, to temporarily plug the treated zones allowing the acid to attack other damaged areas. Later, the PDA can be removed by applying a dissolvent.

By implementing the PDA described here, the acid treatment can be customized to generate a homogeneous zonal coverage, even for heterogeneous wells with long horizontal sections. The variability of the PDA viscosity with the pH can limit and substantially reduce the risk of decreasing the permeability of the treatment zones. Substantially all PDA can be cleared from the ground, such that PDA does not affect the efficiency of the hydraulic fracturing treatment. For example, if a part of the PDA remains stranded in the formation, after flushing with water or acids, the remaining PDA can be flushed out by hydrocarbons, during the hydraulic fracturing treatment. The chemical characteristics of the PDA can also limit and substantially reduce the risk of water retention in the formation and the occurrence of chemical reactions between the formation minerals and stimulation fluids. The systems and processes described here can be implemented to be simple and robust, to thereby decrease the cost of fracture treatments.

FIG. 1A is a diagram of an example well system 100 for applying a matrix acid stimulation or a fracture treatment to a subterranean formation 101. Fracture treatments can be used, for example, to form or propagate fractures in a rock layer by injecting pressurized fluid. The fracture treatment can include an acid treatment to enhance or otherwise influence production of petroleum, natural gas, coal seam gas, or other types of reservoir resources. The example well system 100 includes an injection system 110 that applies fracturing fluid 108 to a reservoir 106 in the subterranean zone 101. The subterranean zone 101 can include a formation, multiple formations or portions of a formation. The injection system 110 includes control trucks 112, pump trucks 114, a wellbore 103, a working string 104 and other equipment. In the example shown in FIG. 1A, the pump trucks 114, the control trucks 112 and other related equipment are above the surface 102, and the wellbore 103, the working string 104, and other equipment are beneath the surface 102. An injection system can be configured as shown in FIG. 1A or in a different manner and it can include additional or different features as appropriate. The injection system 110 can be deployed in any suitable environment, for example, via skid equipment, a marine vessel, sub-sea deployed equipment, or other types of equipment.

The wellbore 103 shown in FIG. 1A includes vertical and horizontal sections. Generally, a wellbore can include horizontal, vertical, slant, curved, and other types of wellbore geometries and orientations, and the acid treatment can generally be applied to any portion of a subterranean zone 101. The wellbore 103 can include a casing that is cemented or otherwise secured to the wellbore wall. The wellbore 103 can be uncased or include uncased sections. Perforations can be formed in the casing to allow fracturing fluids and/or other materials to flow into the reservoir 106. Perforations can be formed using shape charges, a perforating gun, and/or other tools.

The pump trucks 114 can include mobile vehicles, immobile installations, skids, hoses, tubes, fluid tanks or reservoirs, pumps, valves, and/or other suitable structures and equipment. The pump trucks 114 can communicate with the control trucks 112, for example, by a communication link 113. The pump trucks 114 are coupled to the working string 104 to communicate the fracturing fluid 108 into the wellbore 103. The working string 104 can include coiled tubing, sectioned pipe, and/or other structures that communicate fluid through the wellbore 103. The working string 104 can include flow control devices, bypass valves, ports, and or other tools or well devices that control the flow of fracturing fluid from the interior of the working string 104 into the reservoir 106.

The fracturing fluid 108 can include any appropriate fluid or fluid composition. For example, the fracturing fluid 108 can include a sequence of different fluids corresponding to an acid treatment protocol. Within the context example, the fracturing fluid 108 can include an acid solution, PDA and a dissolvent (e.g., water, slurry, brine, oil, or any suitable combination). The processes described can be used to divert acid from fractures 116 with high permeability to generate a homogeneous fracture network.

The control trucks 112 can include mobile vehicles, immobile installations, and/or other suitable structures. The control trucks 112 can control and/or monitor the injection treatment. For example, the control trucks 112 can include communication links that allow the control trucks 112 to communicate with tools, sensors, and/or other devices installed in the wellbore 103. The control trucks 112 can receive data from, or otherwise communicate with, a computing system 124 that monitors one or more aspects of the acid treatment.

In addition, the control trucks 112 can include communication links that allow the control trucks 112 to communicate with the pump trucks 114 and/or other systems. The control trucks 112 can include an injection control system that controls the flow of the fracturing fluid 108 into the reservoir 106. For example, the control trucks 112 can monitor and/or control the concentration, density, volume, flow rate, flow pressure, location, proppant, and/or other properties of the fracturing fluid 108 injected into the reservoir 106. The reservoir 106 can include a fracture network with multiple fractures 116, as shown in FIG. 1A. Some of the fractures 116 can be selected for acid diversion treatment. For example, the control trucks 112 can identify that some fractures 116 include damaged fractures 118. Damaged fractures 118 can be identified based on a locally measured pressure drop that can reduce the effective permeability to oil.

As illustrated in FIG. 1B, in some implementations, the injection system 110 applies an acid diversion treatment to the reservoir 106. The control truck 112 controls and monitors the pump truck 114, which pumps diverter stages in conjunction with acid stages, to temporarily plug the fractures 116 with high permeability with PDA 120 and to allow the acid to attack the damaged fractures 116. The reduction of pressure drop (real time reading) of a treated zone indicates created fractures and successful treatment. Diverter can be injected until pressure drop increases, which indicates temporary blockage of the treated zone. Upon indication of a temporary blockage acid can be injected again to treat a new zone. The characteristics of the fractures can be used by the control trucks 112 to determine the features of a subsequent step, as described with reference to FIGS. 3-6.

Figure 2A:
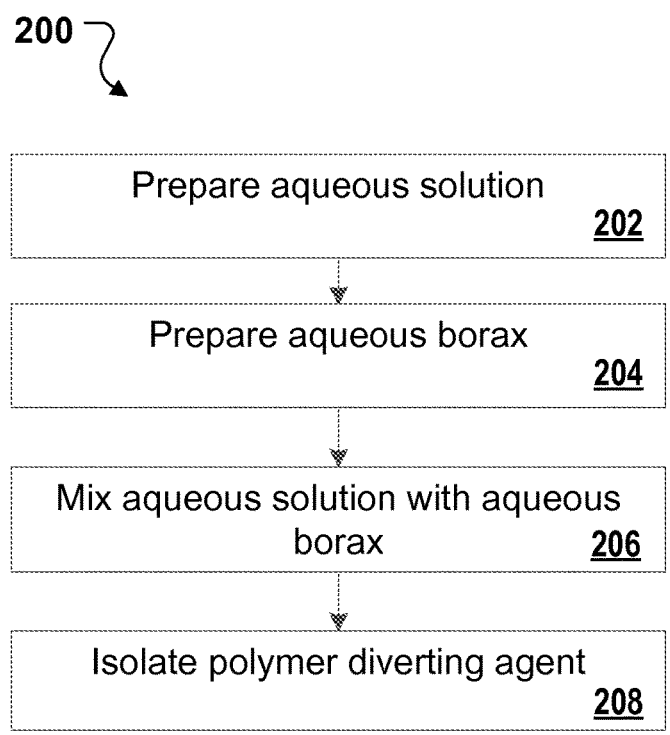
FIG. 2A is a flowchart of an example process for preparing a polymer diverting agent changing its viscosity as function of pH.

FIG. 2A is a flow chart showing an example process 200 for preparing a diverting agent for acid treatment. In some instances, the process 200 is used to prepare a diverting agent for acid fluid in a subterranean formation. At 202, an aqueous PVA solution is obtained. In some implementations, the aqueous PVA solution is prepared by mixing in a suitable mixing container, a quantity (e.g., 30 g to 50 g, such as 40 g) of 4% PVA powder with a quantity (e.g., up to 2 liters such as 1 liter) of distilled water at a temperature value (e.g., 30° C. to 50° C., such as 40° C.). The quantity of aqueous PVA solution is continuously heated to a temperature value (e.g., 85° C. to 95° C., such as 90° C.) in a suitable heater. In some implementations, larger quantities of aqueous PVA solution with proportionally equal quantities of PVA (e.g., approximately 40 g of PVA per liter) and distilled water are obtained. At 204, an aqueous borax solution is obtained. In some implementations, the aqueous borax solution is prepared by mixing in a suitable mixing container, a quantity (e.g., 30 g to 50 g, such as 40 g) of borax powder with a quantity (e.g., up to 2 liters such as 1 liter) of distilled water. In some implementations, larger volumes of aqueous borax solution with proportionally equal concentrations of borax (e.g., approximately 40 g of borax per liter) and distilled water are obtained.

Figure 2B:
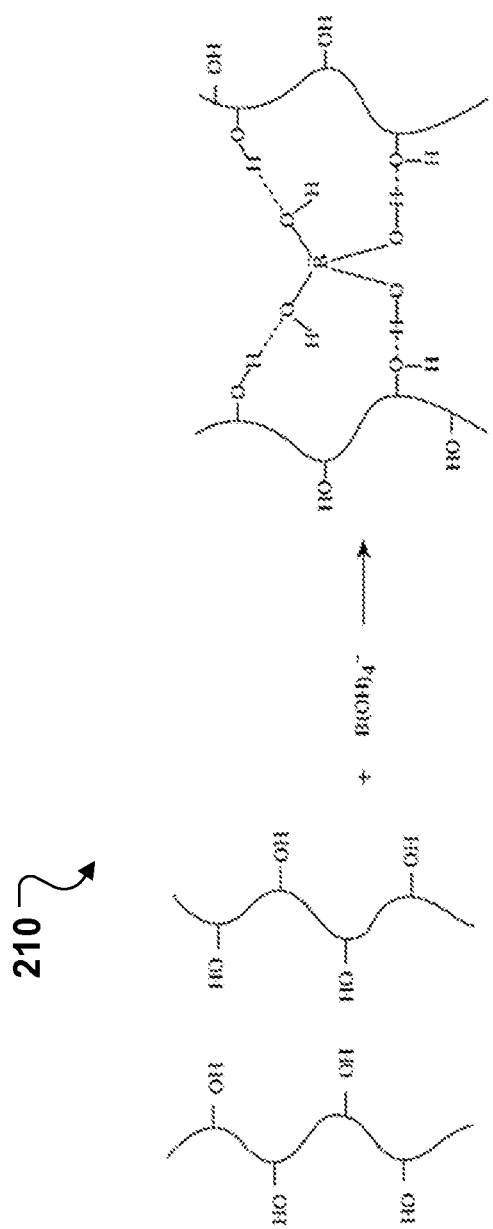
FIG. 2B is an example chemical formula for preparing a polymer diverting agent changing its viscosity as function of pH.

At 206, the diverting agent is formed in a liquid media. The diverting agent is formed by mixing one part of the aqueous borax solution with four parts of the aqueous PVA solution in a suitable mixing container. For example, the diverting agent can be formed by mixing 100 ml of the aqueous borax solution with 400 ml of the aqueous PVA solution. In another example, the diverting agent can be formed by mixing larger quantities of the aqueous borax solution with proportionally larger quantities of the aqueous PVA solution (e.g., the volume of aqueous PVA solution can be approximately four times larger than the volume of aqueous borax solution). After mixing the aqueous borax and aqueous PVA solutions, the PDA can form within a few seconds. In this cross-linking polymerization, the long straight strands of PVA begin to twist and turn as hydrogen bonds begin to form between the —OH groups on borate ions and PVA, as illustrated in FIG. 2B.

208, PDA is isolated from the liquid media. The isolated PDA has active sites on Boron atoms (see the equation below) which have valence electrons to attach to transition metals contained in fractures with high permeability. PDA has low viscosity at concentrated acid medium. When the acid concentration is reduced, for example, upon reacting with the carbonate in a wellbore formation, PDA forms a gel and can divert the acid to less permeable wellbore formations.

Figure 3A:
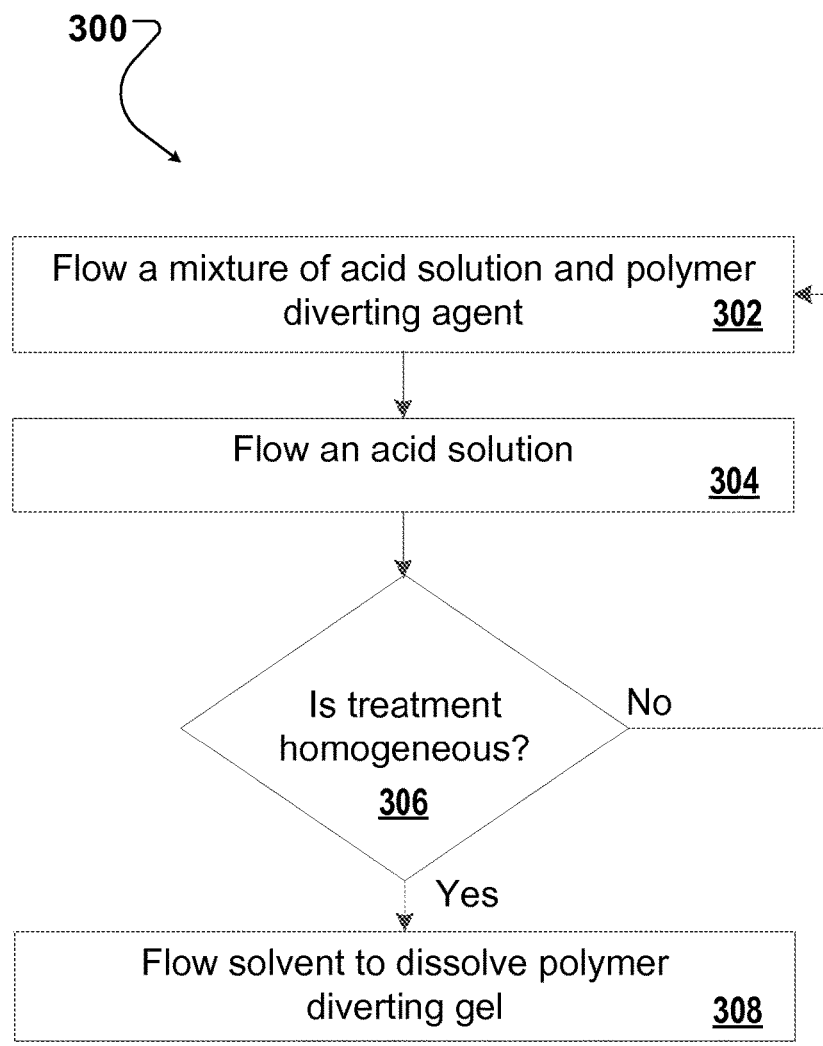
FIG. 3A is a flowchart of an example process for flowing a polymer diverting agent in a wellbore drilling system.

FIG. 3A is a flow chart showing an example process 300 for controlling a flow in a subterranean formation. At 302, a mixture of a first quantity of acid and a second quantity of PDA are flowed to a first portion of a subterranean zone. The first portion of the subterranean zone can be a fracture with high permeability. PDA can be formed by performing a cross-linked polymerization reaction between PVA and borax, as described with reference to FIG. 2A. The PDA has a viscosity that changes with acid concentration, such that the first quantity decreases as the acid reacts with metal in the first portion, and the viscosity of the PDA increases as the first quantity decreases to form a PDA gel. For example, the active site, which includes valence electrons, can attach to transition metals, and therefore form complex molecules, as illustrated in FIG. 3B. The complex molecules can attach to each other and form large micelles and gel material, as illustrated in FIG. 3C.

The acid can include one of hydrochloric acid, acetic acid, citric acid, and formic acid. In some implementations, the first quantity of acid and the second quantity of PDA can depend on one or more characteristics of the first portion of the subterranean zone (e.g., the volume of the first portion of the subterranean zone). At 304, a third quantity of acid is flowed through the subterranean zone. The PDA gel can divert the acid from the first portion to a second portion of the subterranean zone. The second portion of the subterranean zone can be a damaged fracture with low permeability. In some implementations, the third quantity of acid can depend on one or more characteristics of the second portion of the subterranean zone (e.g., the volume of the second portion of a subterranean zone). At 306, the homogeneity of the flow of the acid fluid in the subterranean formation can be verified. For example, homogeneity can be verified by successful acid diversion treatment during multistage acidizing, which is reflected on increased production pressure. In some implementations, upon determining that the flow of the acid fluid in the subterranean formation is inhomogeneous, PDA and acid fluid are repeatedly injected, until homogeneous treatment is achieved. At 308, upon determining that the flow of the acid fluid in the subterranean formation is homogeneous, a dissolvent fluid is injected to remove the PDA gel. The dissolvent fluid can include any of water, oil, brine or any other solution that can dissolve the gel, without affecting the production. In some implementations, the production is started after PDA gel is dissolved.

Figure 4:
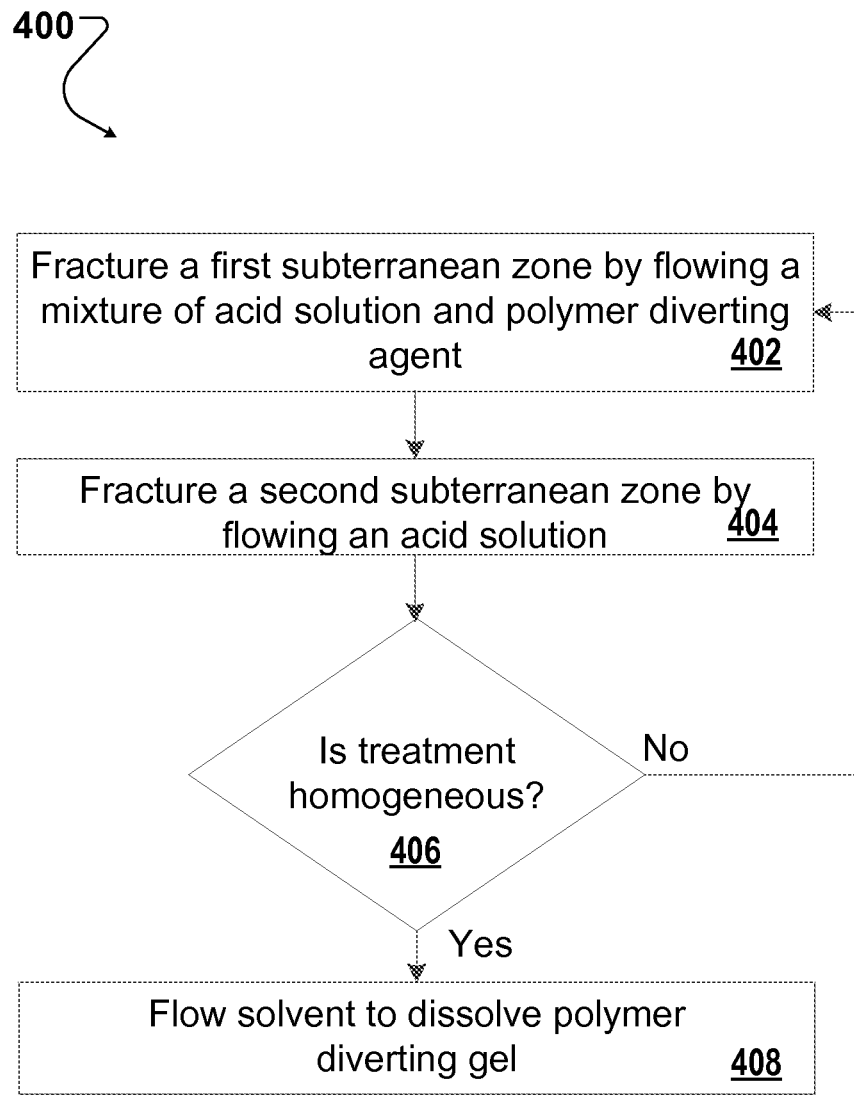
FIG. 4 is a flowchart of an example process for fracturing a zone of a wellbore drilling system.

FIG. 4 is a flow chart showing an example process 400 for fracturing a subterranean formation. At 402, a first fracturing mixture is injected to a first portion of a subterranean zone, such as a fracture with high permeability. The first fracturing mixture can include a first quantity of acid and a second quantity of PDA. The acid can be a dilute acid solution including hydrochloric acid that can clean out cement and debris around the perforations to facilitate the subsequent slickwater solutions employed in fracturing the formation. PDA can be formed by performing a cross-linked polymerization reaction between PVA and borax, as described with reference to FIG. 2. PDA can be a gelling agent, designed to help the transport of a proppant material, such as the acid solution. For example, PDA can have a viscosity that changes with acid concentration, such that the viscosity of the PDA increases as the quantity of acid decreases to form a PDA gel.

At 404, a second fracturing mixture is flowed through the subterranean zone. The second fracturing mixture can include a dilute acid solution that can be diverted by the PDA gel from the first portion of the subterranean zone to a second portion of the subterranean zone, such as a damaged fracture. In some implementations, the second fracturing mixture can further include scale inhibitors, biocide or disinfectant, friction reducing agents, corrosion inhibitors, iron control/stabilizing agents and other additives that can improve fracturing treatment.

At 406, the homogeneity of the fracturing treatment is verified. For example, homogeneity can be verified by successful acid diversion treatment during multistage acidizing, which is reflected on increased production pressure. In case of inhomogeneity (e.g., the production pressure is below a predetermined threshold), the first and second fracturing mixtures are repeatedly injected, until homogeneous fracturing treatment is achieved (e.g., refracture was successful and the percentage of damaged fractures is below the predetermined threshold). At 408, upon determining homogeneous fracturing, a dissolvent fluid is injected to remove the PDA gel. The dissolvent fluid can include any of water, oil, brine and/or any other additives that can improve fracturing treatment. In some implementations, the production is started after PDA gel is dissolved.

Figure 5:
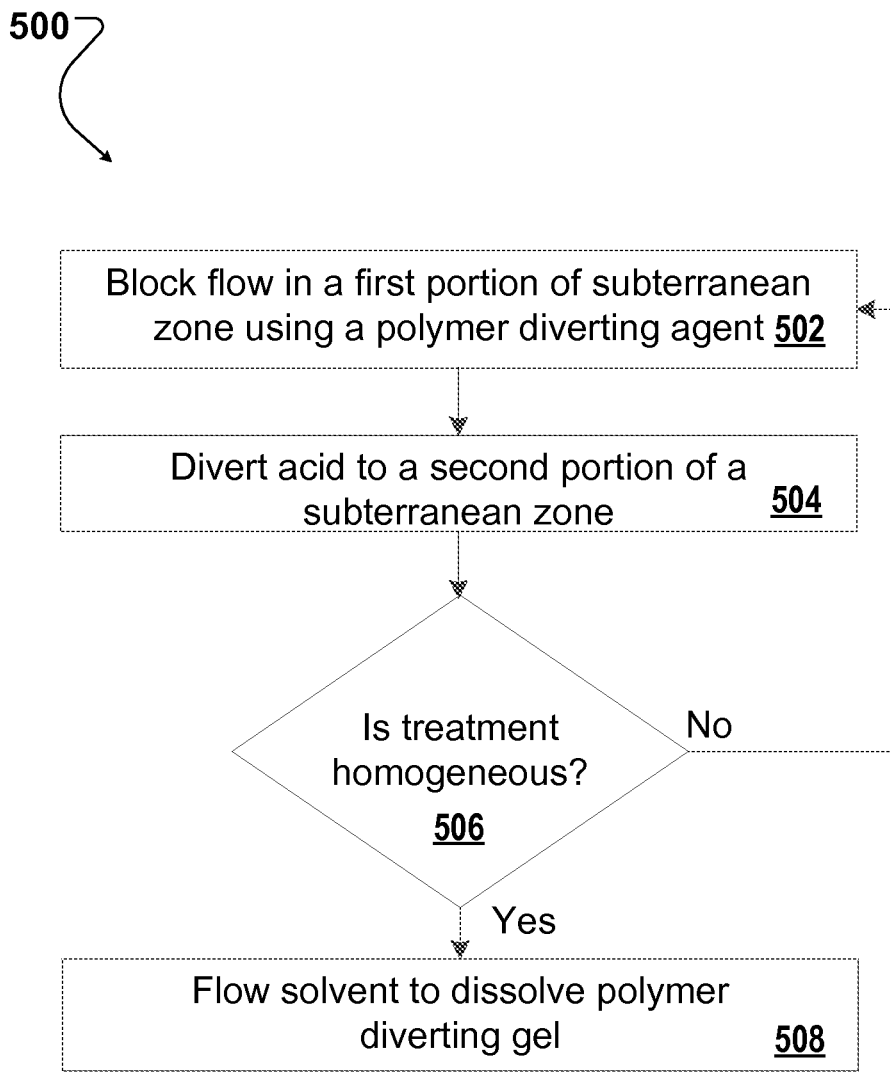
FIG. 5 is a flowchart of an example process for blocking flow in a wellbore drilling system.

FIG. 5 is a flow chart showing an example process 500 for controlling a flow in a subterranean formation. At 502, a flow is temporarily blocked in a first portion of a subterranean zone using a PDA gel. In some implementations, the concentration of PDA solution can range from 3 to 10 wt %. PDA solution can have a viscosity that changes with acid concentration, such that the viscosity of the PDA increases as the quantity of acid decreases in response to the acid reacting with metal in the first portion of the subterranean zone. For example, the PDA solution can form a viscous fluid that can divert acid fluid at a pH equal or higher than 2.5.

At 504, the flow of an acid solution is diverted by the PDA gel from the first portion to a second portion of the subterranean zone. At 506, the extension of the diversion treatment is verified. In case other portions of the subterranean formation require blockage or the first portion of a subterranean zone was not sufficiently blocked, steps 502 and 504 are repeated, until the aimed diversion treatment is achieved. At 508, upon determining that the aimed diversion treatment was achieved, a dissolvent fluid is injected to remove the PDA gel. The dissolvent fluid can include any of water, oil, brine and/or any other additives. In some implementations, the production is started after PDA gel is dissolved.

Figure 6:
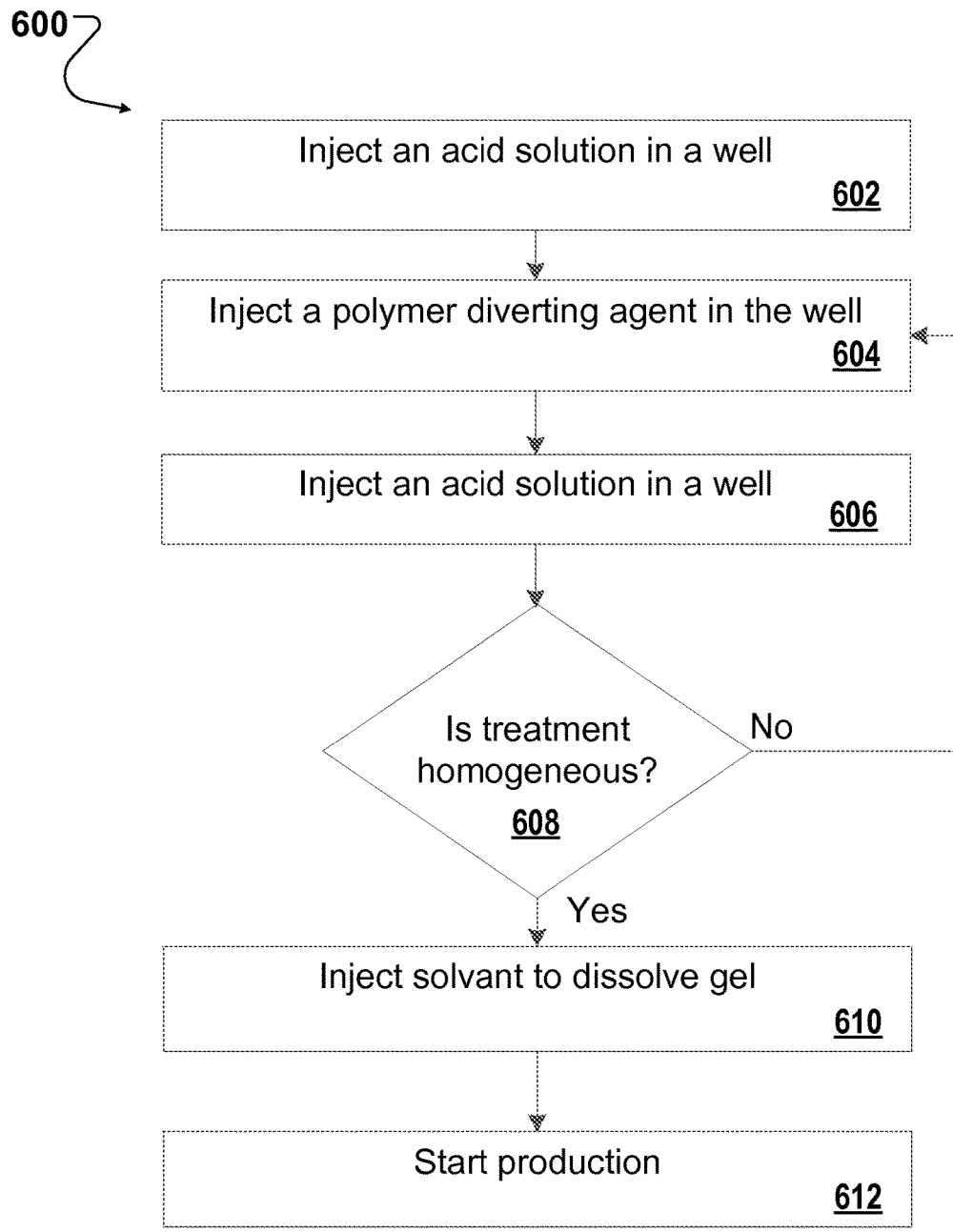
FIG. 6 is a flowchart of an example process for diverting acid in a wellbore drilling system.

FIG. 6 is a flow chart showing an example process 600 for diverting a flow of an acid fluid in a subterranean formation. At 602, the acid fluid is injected in the subterranean formation. For example, the acid fluid can be injected by pump trucks 114 in the working string 104, as discussed with reference to FIG. 1. In some implementations, the injected acid fluid can include 15-20% HCl.

At 604, the PDA solution having a viscosity variable with pH is injected in the subterranean formation. In some implementations, the PDA solution is injected in particularly selected portions of the subterranean formation, such as fractures with high permeability. For example, the PDA solution can be injected in the working string 104, where its flow can be directed by one or more flow control devices, such as bypass valves, ports, and or other tools or well devices that control the flow of the PDA from the interior of the working string 104 into fractures with high permeability. In some implementations, the PDA solution includes borax and it is dissolved in 15%-20% by weight HCl. The borax within the PDA solution can react with metal ions, such as calcium or magnesium, contained by the subterranean formation to form a gel. In particular, the viscosity of the PDA solution can sharply increase, under neutral or high pH conditions. For example, the PDA solution forms a viscous fluid that can divert acid fluid at a pH equal or higher than 2.5.

At 606, the acid fluid is injected in the subterranean formation. The gel formed from PDA can inhibit the flow of the acid fluid, such that the injected acid fluid can affect formations of lower permeability, such as damaged fractures. At 608, the homogeneity of the flow of the acid fluid in the subterranean formation can be verified. Upon determining that the flow of the acid fluid in the subterranean formation is inhomogeneous, PDA and acid fluid are repeatedly injected, until homogeneous treatment is achieved. At 610, upon determining that the flow of the acid fluid in the subterranean formation is homogeneous, a dissolvent fluid is injected to remove the PDA gel. The dissolvent fluid can include any of water, oil, brine or any other solution that can dissolve the gel, without affecting the production. In some implementations, the production is started after the gel is dissolved.

Figure 7:
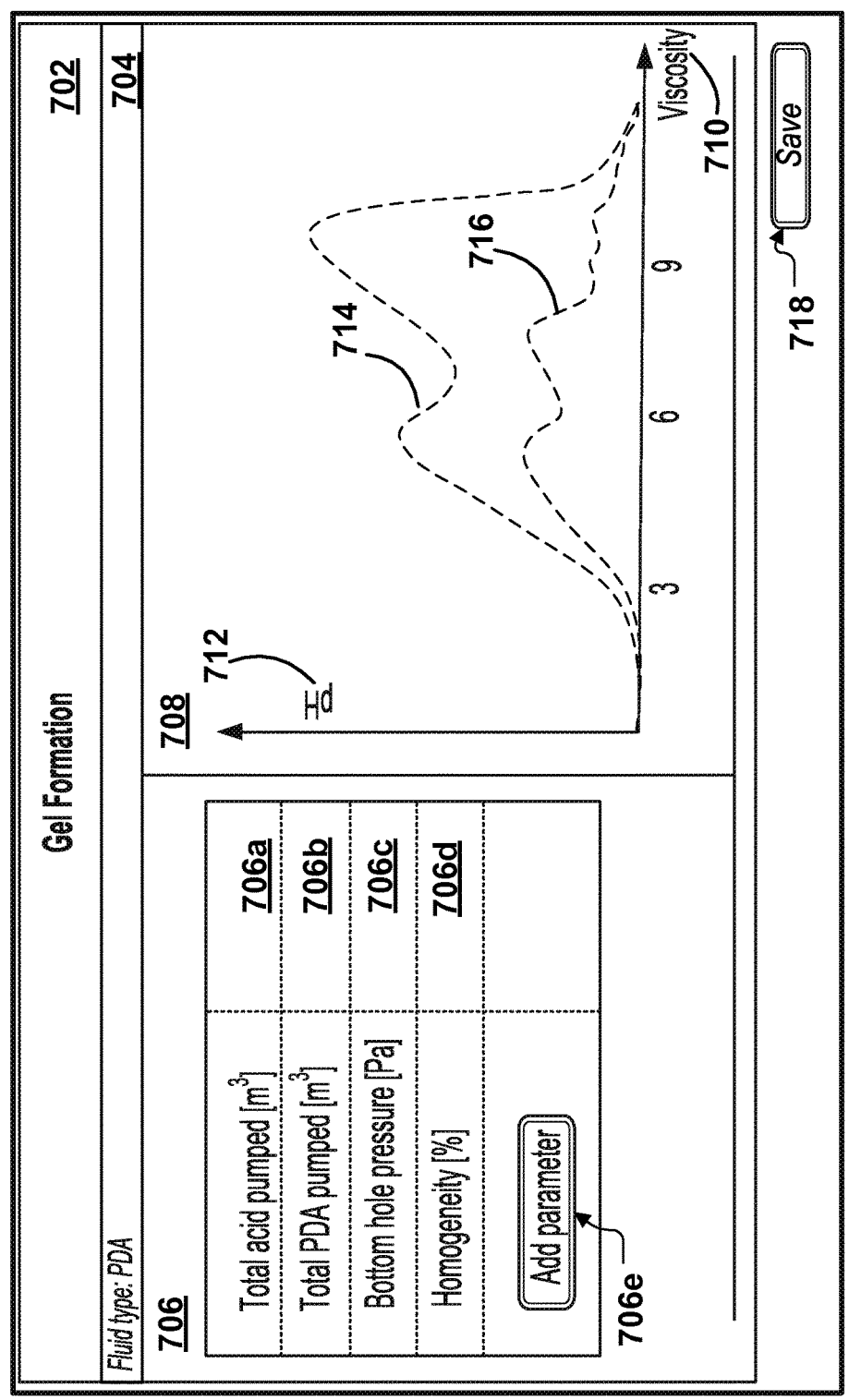
FIG. 7 is an example graphical user interface designed to display polymer diverting agent changing its viscosity as function of pH.

FIG. 7 is an example interface 700 to control the gel formation as function of the solution pH. The illustrated interface 700 includes static text labels, such as the title 702 of the interface 700 and/or an identifier of the display 704, a numerical component 706, a plot component 708 and a control button 718. In some embodiments the numerical component 706 can be a tabulated display of the results of the homogeneity verification, including but not limited to: total acid pumped 706a, total PDA fluid pumped 706b, bottom hole pressure 706c, homogeneity 706d, and/or others. In some embodiments a user can access the displayed results to select the display of a different parameter or to select different units. The numerical component 706 can also include a control button 706f to add additional results for display. In some implementations, the plot component 708 indicates the pH of the flow back measured for each stage, to indicate gel formation and acid diversion.

The plot component 708, can display the gel formation as function of the solution pH. The X-axis 710 can be the solution pH which can also indicate gel formation as surfactants chelate with calcium ions, indicating the reason of high and low solution viscosity depending on pH of solution, and it can cover one or multiple sections of the wellbore. The plot can have a Y-axis, such as change of pH ($\Delta$pH) 712. In some embodiments, a user can access (for example, with a selection) the label of an axis (410 and/or 712) to select a different variable for display. As illustrated, multiple curves (414 and 716) are plotted, corresponding to the neutralization of acidic polymer solution, while the solution gets neutralized using hydroxide ($OH^-$).

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications can be made without departing from the spirit and scope of the disclosure.

The invention claimed is:

1. A method comprising:
generating a mixture of hydraulic fracturing fluids for subterranean zones by performing a cross-linked polymerization reaction between poly-vinyl alcohol (PVA) and sodium tetraborate decahydrate (Borax), the mixture of the hydraulic fracturing fluids comprising a first quantity of an acid and a second quantity of a polymer diverting agent (PDA) having a viscosity that reversibly changes with an acid concentration, and the subterranean zones comprising a metal and a carbonate formation;
hydraulically fracturing a first portion of a subterranean zone by flowing the mixture to the first portion of the subterranean zone, wherein the first quantity of the acid decreases as the acid reacts with the metal and the carbonate formation in the first portion generating a salt comprising the metal and wherein the viscosity of the PDA increases as the first quantity of the acid decreases and the PDA reacts with the metal in the salt to form a PDA gel; and
hydraulically fracturing a second portion of the subterranean zone by flowing a third quantity of the acid through the subterranean zone, wherein the PDA gel diverts the third quantity of acid from the first portion to the second portion of the subterranean zone.

2. The method of claim 1, wherein performing the cross-linked polymerization reaction comprises:
preparing a first solution of a fourth quantity of the PVA in water;
preparing a second solution of a fifth quantity of the Borax in water; and
mixing a first volume of the first solution and a second volume of the second solution.

3. The method of claim 2, wherein the fourth quantity and the fifth quantity is substantially 40 g of the PVA per liter and substantially 40 g of the Borax per liter, respectively.

4. The method of claim 2, further comprising:
heating the water in the first solution to a first temperature before adding the fourth quantity of the PVA; and
heating the water to a second temperature that is greater than the first temperature after adding the fourth quantity of the PVA.

5. The method of claim 4, wherein the first temperature is substantially 50° C. and the second temperature is substantially 90° C.

6. The method of claim 1, wherein a ratio of the second quantity and the first quantity is substantially 15% -20% by weight.

7. The method of claim 1, further comprising verifying a homogeneity of flow between the first portion and the second portion of the subterranean zone.

8. The method of claim 1, further comprising dissolving the PDA gel from the first portion by flowing water to the first portion wherein the water alone dissolves the PDA gel from the first portion.

9. The method of claim 1, wherein the acid comprises hydrochloric acid.

10. A method comprising:
hydraulically fracturing a first portion of a subterranean zone comprising a metal and a carbonate formation by flowing a mixture generated by performing a cross-linked polymerization reaction between poly-vinyl alcohol (PVA) and sodium tetraborate decahydrate (Borax) and comprising a first quantity of an acid and a second quantity of a polymer diverting agent having a viscosity that changes with an acid concentration, wherein the acid fractures the first portion, wherein the first quantity of the acid decreases as the acid reacts with the metal and the carbonate formation in the first portion generating a salt comprising the metal, and wherein the viscosity of the PDA increases as the first quantity of the acid decreases and the PDA reacts with the metal in the salt to form a PDA gel; and hydraulically fracturing a second portion of the subterranean zone by flowing a third quantity of the acid to the first portion, wherein the PDA gel diverts the acid from the first portion to the second zone.

11. The method of claim 10, wherein performing the cross-linked polymerization reaction comprises:

preparing a first solution of a fourth quantity of PVA in water;

preparing a second solution of a fifth quantity of Borax in water; and mixing a first volume of the first solution and a second volume of the second solution.

12. The method of claim 11, wherein the fourth quantity is substantially 40 g of PVA per liter and the fifth quantity is substantially 40 g of Borax per liter.

13. The method of claim 11, further comprising:

heating the water in the first solution to a first temperature of substantially 50° C. before adding the fourth quantity of the PVA; and heating the water to a second temperature of substantially 90° C. after adding the fourth quantity of the PVA.

14. The method of claim 10, wherein a ratio of the second quantity and the first quantity is substantially 15%-20% by weight.

15. The method of claim 10, further comprising dissolving the PDA gel from the first portion by flowing water to the first portion.

16. The method of claim 10, wherein the acid comprises hydrochloric acid.

17. The method of claim 1, wherein at least one of the first portion and the second portion is horizontal.

* * * * *